(12) United States Patent
Foss et al.

(10) Patent No.: US 8,200,554 B1
(45) Date of Patent: Jun. 12, 2012

(54) GRADUATED AUTOMATIC SAVINGS

(75) Inventors: Lucinda Kathryn Foss, San Francisco, CA (US); Lesley K. Grossblatt, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 254 days.

(21) Appl. No.: 12/338,974

(22) Filed: Dec. 18, 2008

(51) Int. Cl.
*G07B 17/00* (2006.01)

(52) U.S. Cl. ........... 705/30; 705/14.48; 705/35; 705/39; 705/42; 705/70

(58) Field of Classification Search .................. None
See application file for complete search history.

(56) References Cited

U.S. PATENT DOCUMENTS

| | | | | |
|---|---|---|---|---|
| 5,878,405 A | * | 3/1999 | Grant et al. ...................... | 705/39 |
| 5,903,881 A | * | 5/1999 | Schrader et al. ................. | 705/42 |
| 6,108,641 A | * | 8/2000 | Kenna et al. ..................... | 705/35 |
| 6,397,196 B1 | * | 5/2002 | Kravetz et al. .................. | 705/35 |
| 7,395,241 B1 | * | 7/2008 | Cook et al. ...................... | 705/39 |
| 7,519,551 B2 | * | 4/2009 | Bent et al. ....................... | 705/35 |
| 7,725,387 B1 | * | 5/2010 | Fitch et al. ...................... | 705/38 |
| 7,734,541 B2 | * | 6/2010 | Kumar et al. .................... | 705/39 |
| 2002/0111886 A1 | * | 8/2002 | Chenevich et al. ............. | 705/30 |
| 2003/0009402 A1 | * | 1/2003 | Mullen et al. ................... | 705/35 |
| 2003/0018557 A1 | * | 1/2003 | Gilbert et al. ................... | 705/36 |
| 2003/0074311 A1 | * | 4/2003 | Saylors et al. ................... | 705/39 |
| 2003/0135462 A1 | * | 7/2003 | Brake et al. ..................... | 705/41 |
| 2003/0149660 A1 | * | 8/2003 | Canfield ......................... | 705/39 |
| 2005/0060253 A1 | * | 3/2005 | Paulsen-Dziuk et al. ....... | 705/35 |
| 2005/0080725 A1 | * | 4/2005 | Pick ................................ | 705/39 |
| 2005/0137953 A1 | * | 6/2005 | McDonough et al. .......... | 705/36 |
| 2005/0149436 A1 | * | 7/2005 | Elterich .......................... | 705/39 |
| 2006/0155617 A1 | * | 7/2006 | Dasilva ........................... | 705/30 |
| 2007/0255658 A1 | * | 11/2007 | Grad ............................... | 705/42 |
| 2009/0037325 A1 | * | 2/2009 | Sarelson et al. ................. | 705/39 |
| 2009/0054205 A1 | * | 2/2009 | Maekawa et al. ............. | 477/109 |

* cited by examiner

*Primary Examiner* — Ryan Zeender
*Assistant Examiner* — Fateh Obaid
(74) *Attorney, Agent, or Firm* — Osha • Liang LLP (57) ABSTRACT

A method for transferring funds, comprising defining a savings parameter associated with a first financial account and a second financial account, wherein the savings parameter adjusts over time based on the funds available in the first financial account and the second financial account, performing a transfer of funds from the first financial account to the second financial account for a transfer amount determined by the savings parameter, and displaying a progress report based on the transfer of funds.

25 Claims, 5 Drawing Sheets

GRADUATED AUTOMATIC SAVINGS

BACKGROUND OF INVENTION

An individual can use a variety of mechanisms to save earnings. Automated, as well as manual, mechanisms currently exist for making transfers between accounts for the purpose of saving at financial institutions. In striving towards a specified savings goal, it is often difficult to immediately start saving capital at an impactful level. Alternatively, saving incrementally until an end capital goal is reached can prove to be a highly effective mechanism for saving, if utilized in a consistent manner. This is, however, difficult for many to accomplish. Psychological factors may create resistance to disciplined, incremental increases in saving. Further, human error, such as forgetting to transfer funds or transferring an incorrect amount, can also impede saving.

SUMMARY OF INVENTION

In general, in one aspect, the invention relates to a method for transferring funds, comprising: defining a savings parameter associated with a first financial account and a second financial account, wherein the savings parameter adjusts over time based on the funds available in the first financial account and the second financial account; performing a transfer of funds from the first financial account to the second financial account for a transfer amount determined by the savings parameter; and displaying a progress report based on the transfer of funds.

In general, in one aspect, the invention relates to a system for transferring funds, comprising: a processor; a memory operatively connected to the processor; and a savings manager resident in the memory and configured to: define a savings parameter associated with a first financial account and a second financial account, wherein the savings parameter adjusts over time based on the funds available in the first financial account and the second financial account; perform a transfer of funds from the first financial account to the second financial account for a transfer amount determined by the savings parameter; and display a progress report based on the transfer of funds.

In general, in one aspect, the invention relates to a computer readable medium storing instructions to transfer funds, the instructions comprising functionality to: define a savings parameter associated with a first financial account and a second financial account, wherein the savings parameter adjusts over time based on the funds available in the first financial account and the second financial account; perform a transfer of funds from the first financial account to the second financial account for a transfer amount determined by the savings parameter; and display a progress report based on the transfer of funds.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for transferring funds. In general, embodiments of the invention provide a system and method for performing fund transfers between financial accounts based on savings parameters.

Figure 1:
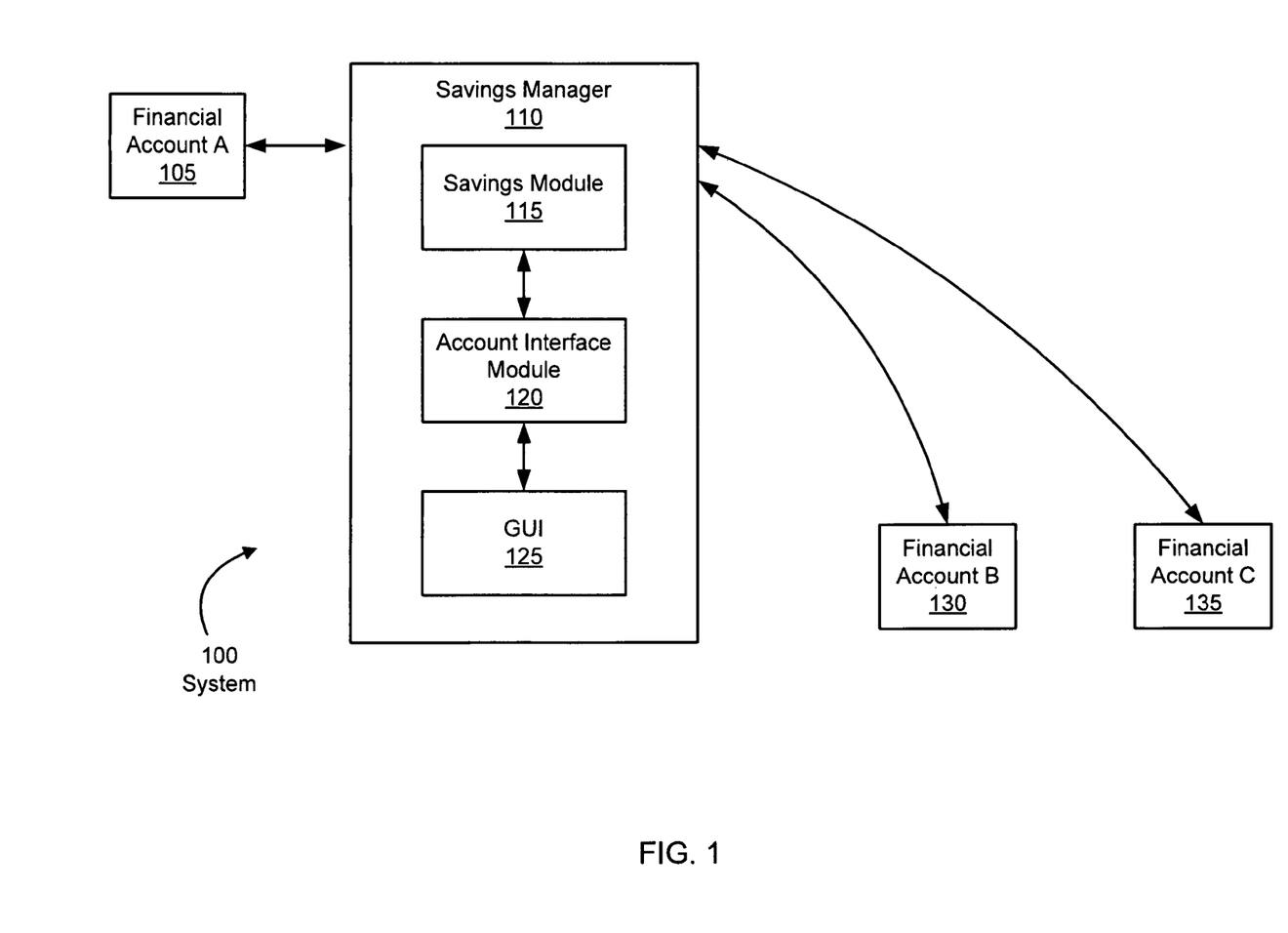
FIG. 1 shows a flow diagram of a system in accordance with one or more embodiments of the invention.

FIG. 1 shows a system (100) in accordance with one or more embodiments of the invention. As shown in FIG. 1, the system (100) includes multiple components such as a savings manager (110) and financial accounts A (105), B (130), and C (135). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one savings manager (110) running on a device, as well as more than one financial account interfacing with the savings manager (110).

In one or more embodiments of the invention, a financial account A (105) (e.g. a payroll account or checking account) contains funds to be transferred (e.g. pre-tax or post-tax). Financial accounts B (130) and C (135) are destination accounts for a portion of the funds from financial account A (105). Financial accounts may include direct deposit accounts, 401(K) accounts, savings accounts, IRA accounts, HSA accounts, checking accounts, and various other types of accounts managed by a financial entity. Payroll accounts may contain monies associated with a paycheck that are to be distributed to various types of financial accounts described above. Those skilled in the art will appreciate that there may be more than one financial account containing or receiving funds from a payroll account.

In one or more embodiments of the invention, a savings manager (110) contains a savings module (115), an account interface module (120), and a graphic user interface (GUI) (125). The GUI (125) acts as an interface between a user and the savings manager (110), and may be displayed on a computer, mobile device, and the like. The account interface module (120) allows the savings manager (110) to communicate with the financial accounts, and may facilitate secure transferring of funds from origination accounts to destination accounts (e.g. through authentication mechanisms such as usernames and passwords and encryption). Those skilled in the art will appreciate that the savings manager is a financial application, and may be associated with various other financial applications in a similarly secure manner.

In one or more embodiments of the invention, the savings module (115) contains the logic associated with transferring funds from an originating financial account to a destination financial account or set of destination financial accounts. The savings module (115) maintains and keeps track of origination accounts, destination accounts, and the savings parameters associated with those accounts. Savings parameters may include time period, transfer amount, transfer percentage, transfer amount increase, transfer percentage increase, milestone, end goal, limit, and other relevant factors. A time period may be a day, month, or any other amount of time over which to transfer funds from an origination account to a destination account. In one or more embodiments of the invention, a transfer amount is a monetary amount to be transferred from an origination account to a destination account each time period. In one or more embodiments of the invention, a transfer percentage is a percentage of the newly deposited or total funds in an origination account to transfer to a destination account. In one or more embodiments of the invention, a transfer amount increase is a monetary amount by which to increase the transfer amount each time period, until reaching a milestone or limit. In one or more embodiments of the invention, a transfer percentage increase is a percentage by which to increase the transfer percentage each time period, until reaching a milestone or limit. In one or more embodiments of the invention, a milestone is a percentage or amount at which to set a savings parameter value (or adjust an existing savings parameter value) in view of an end goal. In one or more embodiments of the invention, an end goal is a capital transfer amount that the user would like to reach in an account. In one or more embodiments of the invention, a limit is a percentage or amount at which to stop percentage or amount increases, or to stop transfers altogether.

In one or more embodiments of the invention, the savings module (115) may maintain disbursement parameters associated with accounts. Disbursement parameters may include disbursement time period, disbursement amount, disbursement percentage, disbursement amount increase, disbursement percentage increase, disbursement milestone, disbursement end goal, disbursement limit, and other relevant factors. In one or more embodiments of the invention, each of these disbursement parameters acts as the savings parameters described above, except that instead of relating to fund transfers from originating accounts to destination accounts, they relate to fund transfers from destination accounts to secondary destination accounts. For example, once an end goal associated with a destination account has been achieved, a disbursement transfer may become activated and commence the transfer of funds from a destination account to a secondary destination account. This may occur if, for instance, a user has saved a specified amount of capital in a destination account for a specific purchase. Once the amount has been saved, the user may want to use those funds to make that purchase, and have the funds disbursed into a checking account. Those skilled in the art will appreciate that there may be numerous disbursement scenarios.

Those skilled in the art will also appreciate that the system may allow users to save capital without the difficulty and resistance associated with larger, non-incremental, manual transfers, and may allow a user to ease into a savings plan incrementally. The savings parameters may be determined by an employee, an employer, or in conjunction with the savings module (115). If an employer specifies the savings parameters associated with a financial account for an employee, the employer may ensure that, for instance, the employee is in compliance with minimum requirements for 401(K) plans. The savings module (115) may also eliminate human error associated with the process of manually transferring funds between financial accounts.

In one or more embodiments of the invention, a configuration of savings parameters may be the following: a monthly transfer period, a transfer percentage of 10 percent per payroll deposit, a percentage increase of 5 percent, and a limit of 25 percent. For each monthly payroll deposit into an origination account, 10 percent of the payroll funds will be transferred to a specified destination account in the first month, 15 percent in the second month, 20 percent in the third month, and 25 percent in the fourth month. At the fifth month and thereafter, the transfer percentage will remain at 25 percent, as the limit is completed. If disbursement parameters are defined, these funds may be transferred to a secondary destination account according to those parameters. Those skilled in the art will appreciate that there may be may more configurations of savings and disbursement parameters.

Figure 2:
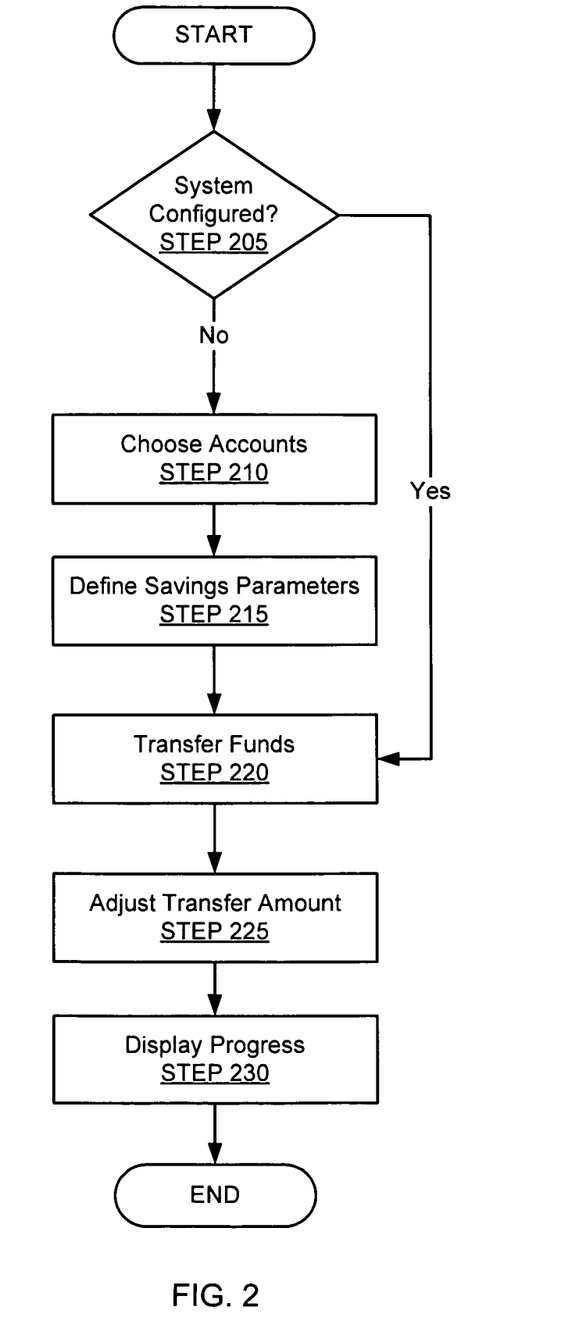
FIG. 2 shows a flowchart of a method in accordance with one or more embodiments of the invention.

FIG. 2 shows a flowchart in accordance with one or more embodiments of the invention. The process shown in FIG. 2 may be used, for example, with system (100) to transfer funds (i.e. the funds transfer system). Those skilled in the art, having the benefit of this detailed description, will appreciate that the sequence of steps shown in FIG. 2 may differ among embodiments of the invention, and that one or more of the steps may be optional.

In STEP 205, a determination is made whether the funds transfer system is configured. Configuration signifies that savings (and disbursement) parameters are assigned values and financial accounts are selected and verified. If the funds transfer system is configured, then the process proceeds to STEP 220. If the funds transfer system is not configured, then process proceeds to STEP 210.

In STEP 210, the funds transfer system is not configured so, the configuration process begins. Initially, input is requested from a user to provide configuration information, or configurations may be suggested based on prior usage, historical information, known financial accounts, or amounts of capital currently held in financial accounts. Specific suggested savings configurations may also be associated with various financial account types (e.g. IRA, 401(K), savings, checking, and the like), as well as user priorities (e.g. low/high capital risk, low/high savings, and the like). If requesting input from a user, the user is prompted to choose originating financial accounts to transfer funds to destination financial accounts. In one or more embodiments of the invention, the user provides authentication information for each account (e.g. login username, login password, unique identifier, routing number, and the like).

In STEP 215, the savings parameters are defined. Defining the saving parameters may be accomplished by prompting the user for savings parameter information. Savings parameter information, as described above, may detail time periods, transfer amounts, transfer percentages, transfer amount increases, transfer percentage increases, milestones, limits and other relevant information. The user may also be prompted for disbursement parameter information.

In STEP 220, funds are transferred from the specified originating financial accounts to the specified destination financial accounts, as determined by the savings parameters in accordance with one or more embodiments of the invention. Additionally, permission may be requested to transfer funds from the originating financial account to another destination account, based on the savings parameters for a prior destination account.

In STEP 225, the amount to be transferred from the originating accounts to the destination accounts is adjusted, based on the savings parameters. Additionally, adjusted savings parameter values may be suggested, based on the capital amounts in the accounts, and progress towards goals associated with the accounts.

In STEP 230, progress towards goals of the transfers from an originating financial account to destination financial accounts is displayed. Progress may be displayed on a computer, mobile device, paystub, or through another method, and may be in the form of a text message, an email, and other related forms of information transfer.

FIGS. 3A, 3B, 3C, and 3D show examples in accordance with one or more embodiments of the invention. The process demonstrated in FIGS. 3A, 3B, 3C, and 3D may be used, for example, with the system (100), to transfer funds. Those skilled in the art, having the benefit of this detailed description, will appreciate that the sequence of steps shown in FIGS. 3A, 3B, 3C, and 3D may differ among embodiments of the invention, and that one or more of the steps may be optional.

Figure 3A:
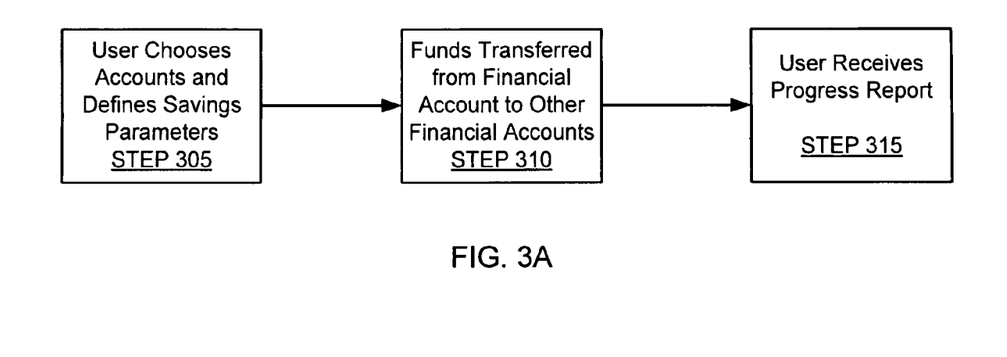
FIGS. 3A, 3B, 3C, and 3D show examples in accordance with one or more embodiments of the invention.

FIG. 3A details the process in which funds are transferred from a financial account to a set of other financial accounts. In STEP 305, a user initially chooses the originating account and the destination accounts, and defines the savings parameters. Subsequently, the process proceeds to STEP 310. In STEP 310, the funds are then transferred from the originating financial account to the destination accounts, as determined by the savings parameters. In STEP 315, the user finally receives a progress report detailing the transfer of funds. The process then ends.

Figure 3B:
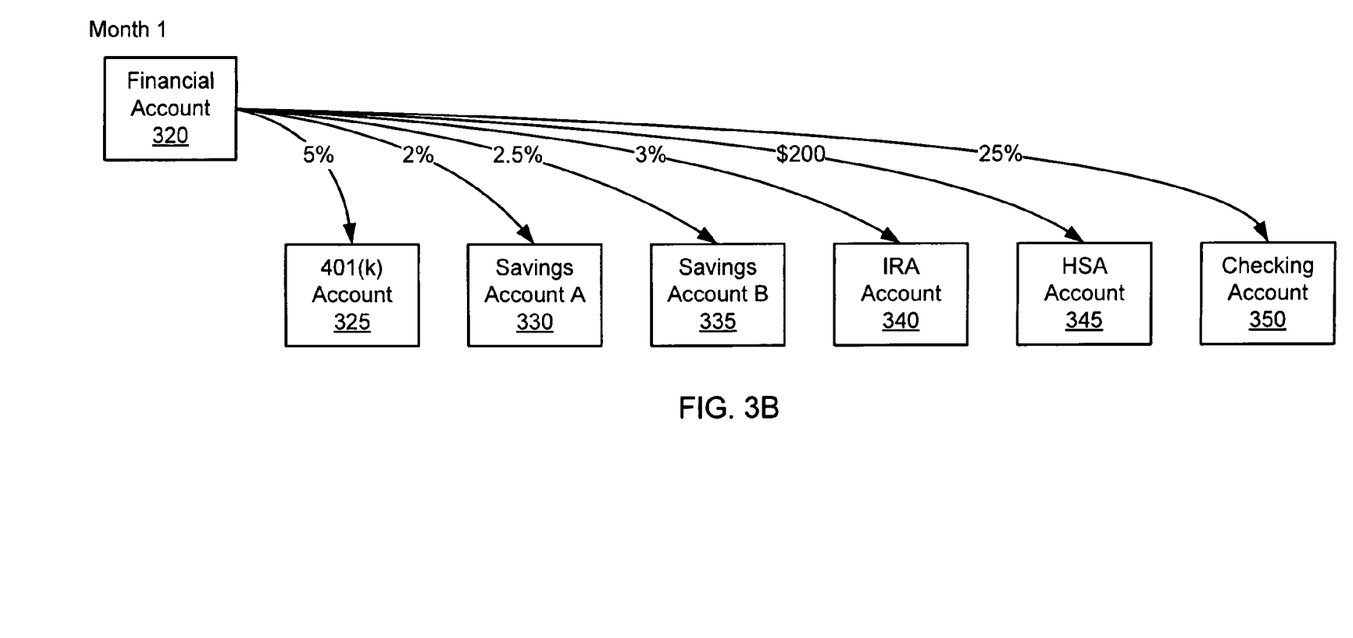

FIG. 3B details the exemplary process described in FIG. 3A at month 1. Funds from an originating financial account (320) are transferred to destination accounts including a 401 (K) account (325), savings account A (330), savings account B (335), an IRA account (340), an HSA account (345), and a checking account (350). The savings parameters associated with these accounts specify that varying amounts of funds be transferred to each account. The 401(K) account (325) receives 5 percent of the just deposited payroll funds from the originating financial account, the savings account A (330) receives 2 percent, the savings account B (335) receives 2.5 percent, the IRA account (340) receives 3 percent, the HSA account (345) receives $200 from the payroll funds, and the checking account (350) receives 25 percent of the payroll funds.

Figure 3C:
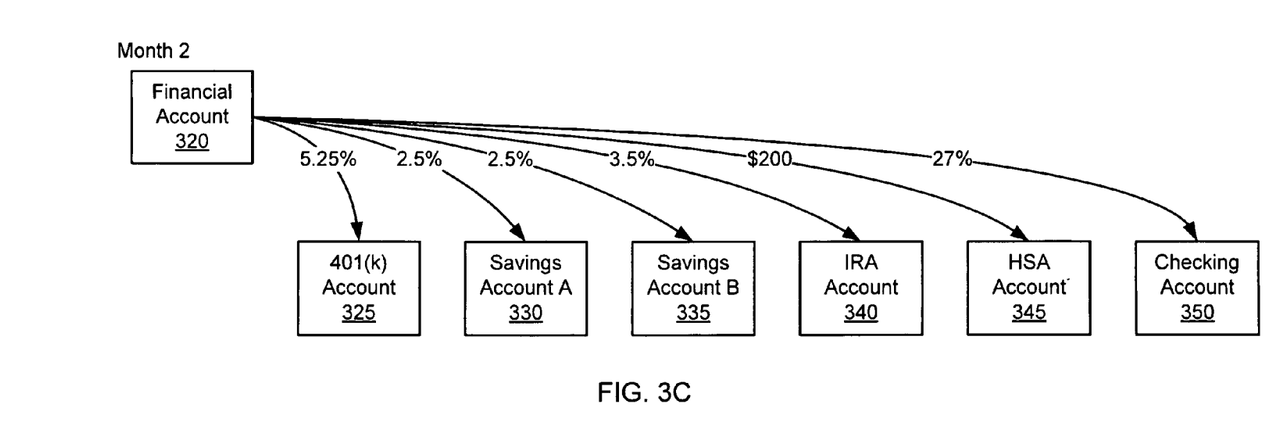

FIG. 3C details the exemplary process described in FIG. 3A at month 2. Again, payroll funds deposited into the originating account (320) are transferred to the destination accounts according to the savings parameters. This time, the 401(K) account (325) receives 5.25 percent of the funds, savings account A (330) receives 2.5 percent, savings account B (335) receives 2.5 percent, the IRA account (340) receives 3.5 percent, the HSA account (345) receives $200, and the checking account (350) receives 27 percent of the payroll funds. The transfer percentage increase and transfer amount increase savings parameters specify the 401(K) account (325) receives 0.25 percent more than the previous month, savings account A (330) receives 0.5 percent more than the previous month, savings account B (335) receives a constant percentage amount of 2.5 percent of the funds, the IRA account (340) receives 0.5 percent more than the previous month, the HSA account (345) receives a constant amount of $200 of the funds, and the checking account (350) receives 2 percent more than the previous month.

Figure 3D:
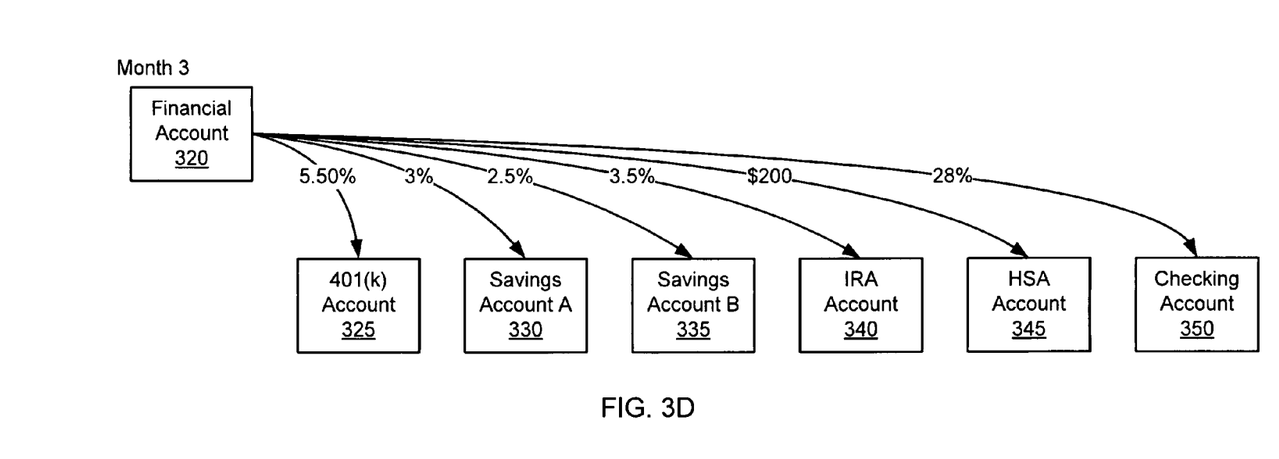

FIG. 3D details the exemplary process described in FIG. 3A at month 3. Yet again, payroll funds just deposited into the originating account (320) are transferred to the destination accounts according to the savings parameters. This month, the 401(K) account (325) receives 5.50 percent of the funds, savings account A (330) receives 3 percent, savings account B (335) receives 2.5 percent, the IRA account (340) receives 3.5 percent, the HSA account (345) receives $200, and the checking account (350) receives 28 percent of the payroll funds. The 401(K) account (325) receives 0.25 percent more than the previous month, savings account A (330) again receives 0.5 percent more than month 2, savings account B (335) still receives a constant percentage amount of 2.5 percent of the funds, the IRA account (340) receives 0 percent more than the previous month (3.5 percent) because the target amount for this account has been reached, capping the percentage increase of transfers, the HSA account (345) again receives a constant amount of $200 of the funds, and the checking account (350) receives 1 percent more than the previous month, as again the target amount for this account was reached (after a 1 percent increase). If the payroll increases (i.e. the user received a raise), then the corresponding transfer percentages remains the same, but the transfer amounts based on those percentages increases. The savings parameters may aid a user to implement fiscal discipline, as each month transfers are made based on already determined savings parameters. Those skilled in the art will appreciate that this scenario is exemplary, and that many other fund transfer configurations are possible that falls within the scope and intent of this invention.

Figure 4:
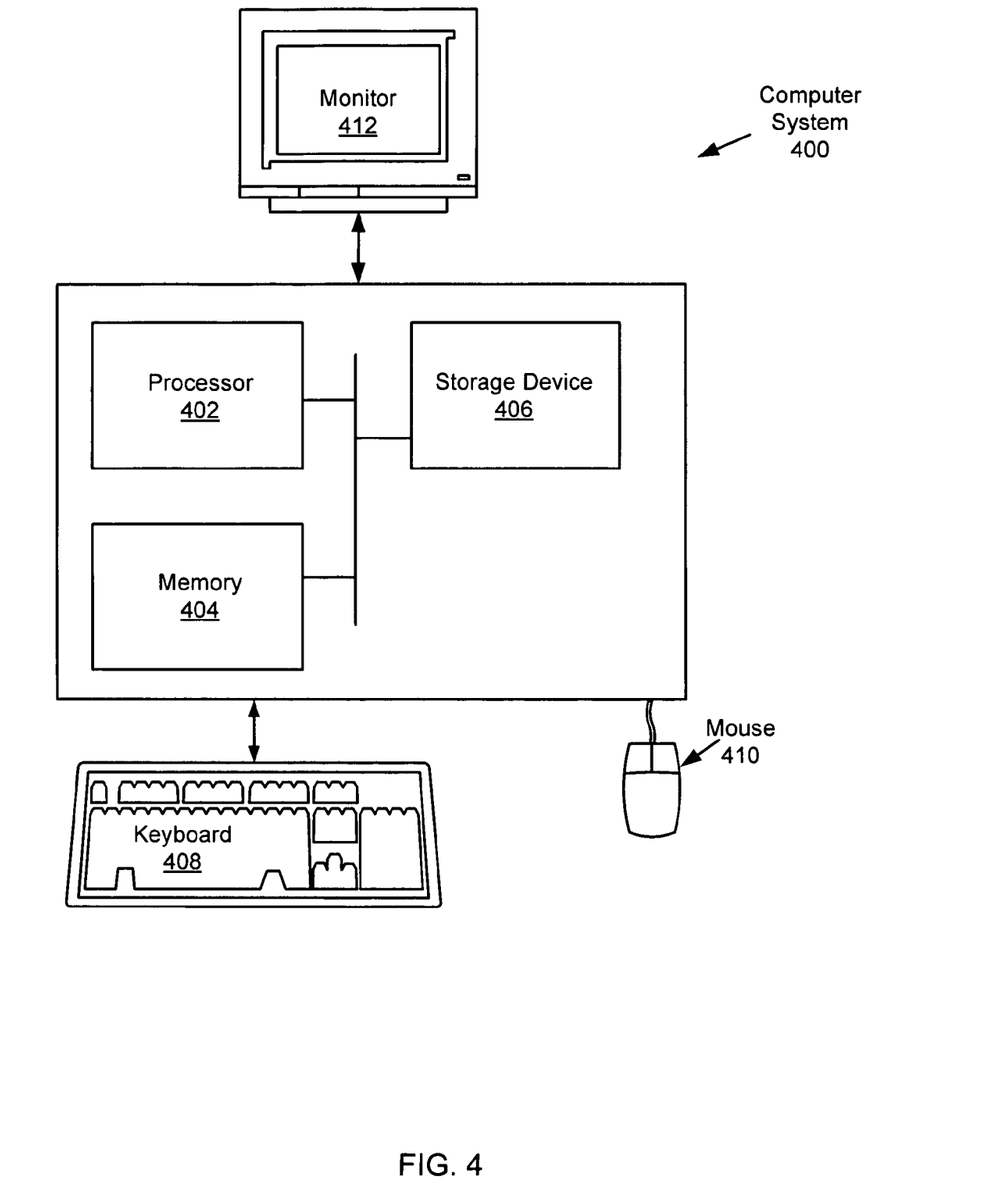
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transferring a plurality of funds, comprising:
    identifying an origination financial account comprising the plurality of funds and a destination financial account;
    identifying an initial transfer percentage that is a numerical proportion of the plurality of funds for transfer from the origination financial account to the destination financial account;
    transferring, by a processor and at an initial time, an initial transfer amount equaling the initial transfer percentage of the plurality of funds from the origination financial account to the destination financial account for reaching an end goal, wherein the end goal is a capital savings amount saved in the destination financial account;
    identifying, automatically and by the processor, after transferring the initial transfer amount, a pre-determined transfer percentage increase that is a numeric percentage value by which to increase the initial transfer percentage;
    calculating, automatically and by the processor, an increased transfer percentage by adding the initial transfer percentage and the pre-determined transfer percentage increase;
    transferring, by the processor and at a later time, an increased transfer amount equaling the increased transfer percentage of the plurality of funds from the origination financial account to the destination financial account for reaching the end goal; and
    displaying a progress report comprising the origination financial account, the destination financial account, the initial transfer amount, the increased transfer amount, and the end goal.

2. The method of claim 1, wherein the origination financial account is a payroll account, and wherein the destination financial account is a checking account.

3. A system for transferring a plurality of funds, comprising:
    a processor;
    a memory operatively connected to the processor; and
    a savings manager executing on the processor, resident in the memory, and configured to:
        identify an origination financial account comprising the plurality of funds and a destination financial account;
        identify an initial transfer percentage that is a numerical proportion of the plurality of funds for transfer from the origination financial account to the destination financial account;
        transfer, at an initial time, an initial transfer amount equaling the initial transfer percentage of the plurality of funds from the origination financial account to the destination financial account for reaching an end goal, wherein the end goal is a capital savings amount saved in the destination financial account;
        identify, automatically and after transferring the initial transfer amount, a pre-determined transfer percentage increase that is a numeric percentage value by which to increase the initial transfer percentage;
        calculate, automatically, an increased transfer percentage by adding the initial transfer percentage and the pre-determined transfer percentage increase;
        transfer, at a later time, an increased transfer amount equaling the increased transfer percentage of the plurality of funds from the origination financial account to the destination financial account for reaching the end goal; and
        display a progress report comprising the origination financial account, the destination financial account, the initial transfer amount, the increased transfer amount, and the end goal.

4. The system of claim 3, wherein the origination financial account is a payroll account, and wherein the destination financial account is a checking account.

5. The system of claim 3, wherein the savings manager is a financial application.

6. A non-transitory computer readable medium storing instructions for transferring a plurality of funds, the instructions comprising functionality for:
    identifying an origination financial account comprising the plurality of funds and a destination financial account;
    identifying an initial transfer percentage that is a numerical proportion of the plurality of funds for transfer from the origination financial account to the destination financial account;
    transferring, at an initial time, an initial transfer amount equaling the initial transfer percentage of the plurality of funds from the origination financial account to the destination financial account for reaching an end goal, wherein the end goal is a capital savings amount saved in the destination financial account;
    identifying, automatically and after transferring the initial transfer amount, a pre-determined transfer percentage increase that is a numeric percentage value by which to increase the initial transfer percentage;
    calculating, automatically, an increased transfer percentage by adding the initial transfer percentage and the pre-determined transfer percentage increase;
    transferring, at a later time, an increased transfer amount equaling the increased transfer percentage of the plurality of funds from the origination financial account to the destination financial account for reaching the end goal; and
    displaying a progress report comprising the origination financial account, the destination financial account, the initial transfer amount, the increased transfer amount, and the end goal.

7. The non-transitory computer readable medium of claim 6, wherein the origination financial account is a payroll account, and wherein the destination financial account is a checking account.

8. The method of claim 1, further comprising:
    calculating a total transfer amount by adding the initial transfer amount, the increased transfer amount, and a third transfer amount; and
    in response to the total transfer amount exceeding the end goal, transferring the total transfer amount from the destination financial account to a secondary destination financial account.

9. The method of claim 8, further comprising:
    paying for a purchase using a portion of the total transfer amount in the secondary destination financial account.

10. The method of claim 1, further comprising:
    calculating a total transfer amount by adding the initial transfer amount, the increased transfer amount, and a third transfer amount;

identifying an initial disbursement percentage that is a numerical proportion of the total transfer amount; and transferring, by the processor and in response to the total transfer amount exceeding the end goal, a third transfer amount equaling the initial disbursement percentage of the total transfer amount from the destination financial account to a secondary destination financial account.

11. The method of claim 1, further comprising:

determining an origination financial account type of the origination financial account and a destination financial account type of the destination financial account;

determining a capital risk profile of a user; and determining the initial transfer percentage, the pre-determined transfer percentage increase, and a pre-determined limit based on the origination financial account type, the destination financial account type, and the capital risk profile.

12. The method of claim 1, further comprising:

calculating, after transferring the increased transfer amount, a third transfer percentage by adding the increased transfer percentage and the pre-determined transfer percentage increase;

transferring, in response to the third transfer percentage exceeding a pre-determined limit and by the processor, a third transfer amount equaling the increased transfer percentage of the plurality of funds from the origination financial account to the destination financial account;

identifying a fourth transfer amount that is a monetary amount for transfer from the origination financial account to a second destination financial account;

transferring, by the processor, the fourth transfer amount from the origination financial account to the second destination financial account;

calculating, after transferring the fourth transfer amount, a fifth transfer amount by adding the fourth transfer amount and a pre-determined transfer amount increase;

transferring, by the processor, the fifth transfer amount from the origination financial account to the second destination financial account;

calculating, after transferring the fifth transfer amount, a sixth transfer amount by adding the fifth transfer amount and the pre-determined transfer amount increase; and transferring, in response to the sixth transfer amount exceeding a pre-determined milestone and by the processor, the fifth transfer amount from the origination financial account to the second destination financial account.

13. The method of claim 1, further comprising:

determining a revised transfer percentage increase based on the plurality of funds in the origination financial account and progress towards the end goal; and providing the revised transfer percentage as a recommendation to a user.

14. The system of claim 3, wherein the savings manager is further configured to:

calculate a total transfer amount by adding the initial transfer amount, the increased transfer amount, and a third transfer amount; and in response to the total transfer amount exceeding the end goal, transfer the total transfer amount from the destination financial account to a secondary destination financial account.

15. The system of claim 14, wherein the savings manager is further configured to:

pay for a purchase using a portion of the total transfer amount in the secondary destination financial account.

16. The system of claim 3, wherein the savings manager is further configured to:

calculate a total transfer amount by adding the initial transfer amount, the increased transfer amount, and a third transfer amount;

identify an initial disbursement percentage that is a numerical proportion of the total transfer amount; and transfer, in response to the total transfer amount exceeding the end goal, a third transfer amount equaling the initial disbursement percentage of the total transfer amount from the destination financial account to a secondary destination financial account.

17. The system of claim 3, wherein the savings manager is further configured to:

determine an origination financial account type of the origination financial account and a destination financial account type of the destination financial account;

determine a capital risk profile of a user; and determine the initial transfer percentage, the pre-determined transfer percentage increase, and a pre-determined limit based on the origination financial account type, the destination financial account type, and the capital risk profile.

18. The system of claim 3, wherein the savings manager is further configured to:

calculate, after transferring the increased transfer amount, a third transfer percentage by adding the increased transfer percentage and the pre-determined transfer percentage increase;

transfer, in response to the third transfer percentage exceeding a pre-determined limit, a third transfer amount equaling the increased transfer percentage of the plurality of funds from the origination financial account to the destination financial account;

identify a fourth transfer amount that is a monetary amount for transfer from the origination financial account to a second destination financial account;

transfer the fourth transfer amount from the origination financial account to the second destination financial account;

calculate, after transferring the fourth transfer amount, a fifth transfer amount by adding the fourth transfer amount and a pre-determined transfer amount increase;

transfer the fifth transfer amount from the origination financial account to the second destination financial account;

calculate, after transferring the fifth transfer amount, a sixth transfer amount by adding the fifth transfer amount and the pre-determined transfer amount increase; and transfer, in response to the sixth transfer amount exceeding a pre-determined milestone, the fifth transfer amount from the origination financial account to the second destination financial account.

19. The system of claim 3, further comprising:

determine a revised transfer percentage increase based on the plurality of funds in the origination financial account and progress towards the end goal; and provide the revised transfer percentage as a recommendation to a user.

20. The non-transitory computer readable medium of claim 6, the instructions further comprising functionality for:

calculating a total transfer amount by adding the initial transfer amount, the increased transfer amount, and a third transfer amount; and in response to the total transfer amount exceeding the end goal, transferring the total transfer amount from the destination financial account to a secondary destination financial account.

21. The non-transitory computer readable medium of claim 20, the instructions further comprising functionality for:
paying for a purchase using a portion of the total transfer amount in the secondary destination financial account.

22. The non-transitory computer readable medium of claim 6, the instructions further comprising functionality for:
calculating a total transfer amount by adding the initial transfer amount, the increased transfer amount, and a third transfer amount;
identifying an initial disbursement percentage that is a numerical proportion of the total transfer amount; and
transferring, in response to the total transfer amount exceeding the end goal, a third transfer amount equaling the initial disbursement percentage of the total transfer amount from the destination financial account to a secondary destination financial account.

23. The non-transitory computer readable medium of claim 6, the instructions further comprising functionality for:
determining an origination financial account type of the origination financial account and a destination financial account type of the destination financial account;
determining a capital risk profile of a user; and
determining the initial transfer percentage, the pre-determined transfer percentage increase, and a pre-determined limit based on the origination financial account type, the destination financial account type, and the capital risk profile.

24. The non-transitory computer readable medium of claim 6, the instructions further comprising functionality for:
calculating, after transferring the increased transfer amount, a third transfer percentage by adding the increased transfer percentage and the pre-determined transfer percentage increase;
transferring, in response to the third transfer percentage exceeding a pre-determined limit, a third transfer amount equaling the increased transfer percentage of the plurality of funds from the origination financial account to the destination financial account;
identifying a fourth transfer amount that is a monetary amount for transfer from the origination financial account to a second destination financial account;
transferring the fourth transfer amount from the origination financial account to the second destination financial account;
calculating, after transferring the fourth transfer amount, a fifth transfer amount by adding the fourth transfer amount and a pre-determined transfer amount increase;
transferring the fifth transfer amount from the origination financial account to the second destination financial account;
calculating, after transferring the fifth transfer amount, a sixth transfer amount by adding the fifth transfer amount and the pre-determined transfer amount increase; and
transferring, in response to the sixth transfer amount exceeding a pre-determined milestone, the fifth transfer amount from the origination financial account to the second destination financial account.

25. The non-transitory computer readable medium of claim 6, the instructions further comprising functionality for:
determining a revised transfer percentage increase based on the plurality of funds in the origination financial account and progress towards the end goal; and
providing the revised transfer percentage as a recommendation to a user.

\* \* \* \* \*